Sept. 15, 1936.  D. B. BAKER ET AL  2,054,533
TRACK ADJUSTMENT FOR TRACK TYPE TRACTORS
Filed Feb. 24, 1936  2 Sheets-Sheet 1

Inventors
D. B. Baker
C. R. Rogers
N. O. Panzegrau
By V. F. Lassagne
Att'y

Sept. 15, 1936.   D. B. BAKER ET AL   2,054,533
TRACK ADJUSTMENT FOR TRACK TYPE TRACTORS
Filed Feb. 24, 1936   2 Sheets-Sheet 2
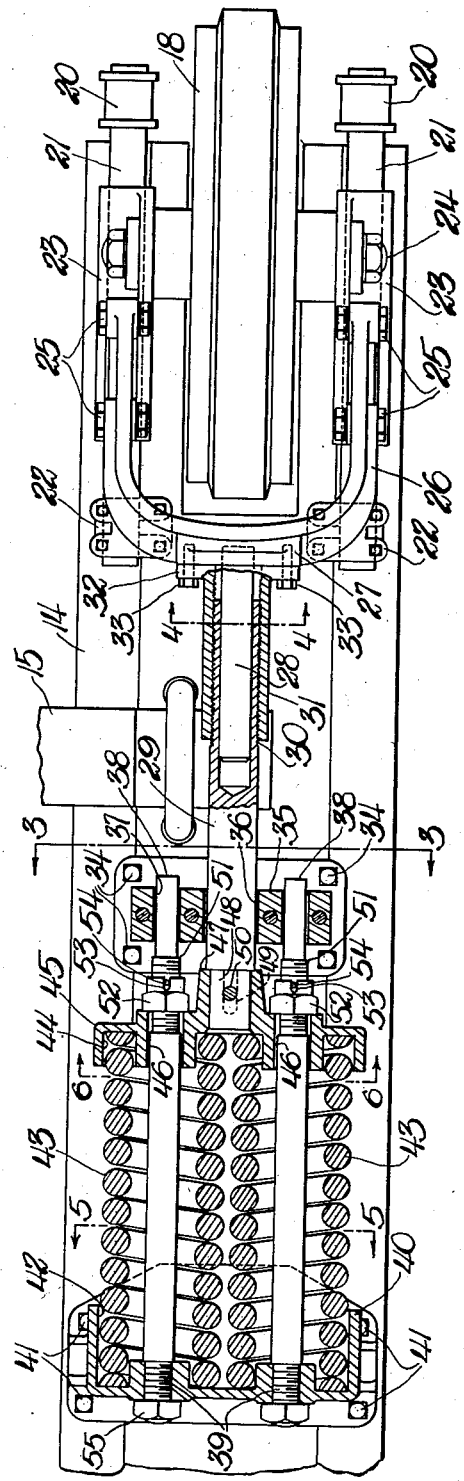
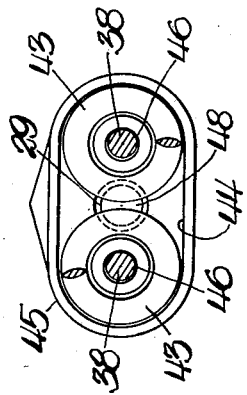
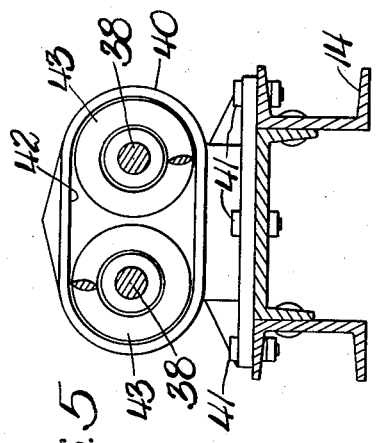
Inventors
D. B. Baker
C. R. Rogers
N. O. Panzegrau
By
Atty.

Patented Sept. 15, 1936

2,054,533

UNITED STATES PATENT OFFICE 2,054,533

TRACK ADJUSTMENT FOR TRACK TYPE TRACTORS

David B. Baker, Riverside, Clifford R. Rogers, Oak Park, and Norman O. Panzegrau, Chicago, Ill., assignors to International Harvester Company, a corporation of New Jersey Application February 24, 1936, Serial No. 65,384

14 Claims. (Cl. 74—242.14)

This invention relates to track-type tractors, and more particularly to an improved track adjustment for the endless belts utilized in carrying and propelling these tractors.

As is well known in the art, these tractors comprise a pair of longitudinal, endless tracks spaced in parallelism with each of the tracks enveloping a side track frame on which is carried the body or main frame of the tractor in such a manner that the weight of the body or main frame is transmitted to the side track frames and thence to the tracks along their ground stretch and to the ground. Each track envelopes a driving sprocket wheel located at the rear end of each side track frame, and the forward end of each side track frame carries an idler wheel around which the forward loop of each track belt is wrapped.

These endless tracks are composed of articulated, connected track shoes, and each belt is adjustably set to a predetermined tightness and thus, when a stone or other obstruction enters the track mechanism, the track is caused to tighten too much and sometimes to such an extent that breakage occurs. Accordingly, the front idler in each track unit is movably mounted and backed by a cushion or recoil spring, which functions to permit temporary slack to be automatically produced in the track belts when an obstruction enters the track mechanism, so that, by means of the slackness produced, the obstruction will automatically work itself out of the track mechanism and prevent damage thereto. These recoil springs do not push on the idler wheels and cause tension of the track belt, but merely serve as a recoil back stop or cushion when brought into play, as above stated, to cause release of track obstructions. These springs are necessarily heavy and strong since they must take the entire draw-bar push of the tractor when it is moving in reverse gear, and consequently it is customary to fix these springs in a compression of several thousand pounds. This compression set of the springs is factory determined when the tractor is built and originally assembled. The mounting of the springs should be such that the initial and proper set of spring compression is not readily alterable. However, it so happens that after the tractor has been used, due to friction and wear, the track belts develop slack which must eventually be taken up without disturbing the original compression set of the recoil springs. It, therefore, follows that the idler wheel must be mounted for longitudinal adjustment on the front end of the track side frame, and this invention also provides means for accomplishing this result as well as providing an improved journal mounting for movably carrying the idler wheels.

The primary object of the invention is to provide an improved mounting for an idler wheel in the type of structure above generally described.

Another object is to provide an improved recoil spring assembly and mounting, against which the idler will automatically back itself, to produce slack in the belt when an obstruction enters the same.

Another object is generally to improve these idler mounting structures to facilitate assembly thereof as well as to facilitate the method of initially compressing the springs.

Other important objects will become apparent to those skilled in the art as the disclosure is more fully made.

These desirable objects are accomplished by the improved structure illustrated in detail in the accompanying sheets of drawings, in which:

Figure 2 is a general, horizontal, sectional view, partly in plan, and on an enlarged scale showing this improved structure as viewed along the line 2—2 of Figure 1;

Figure 5 is a similar cross sectional view taken along the line 5—5 of Figure 2, looking in the direction of the arrows; and, Figure 6 is another cross sectional view taken along the line 6—6 of Figure 2, looking in the direction of the arrows.

Figure 1:
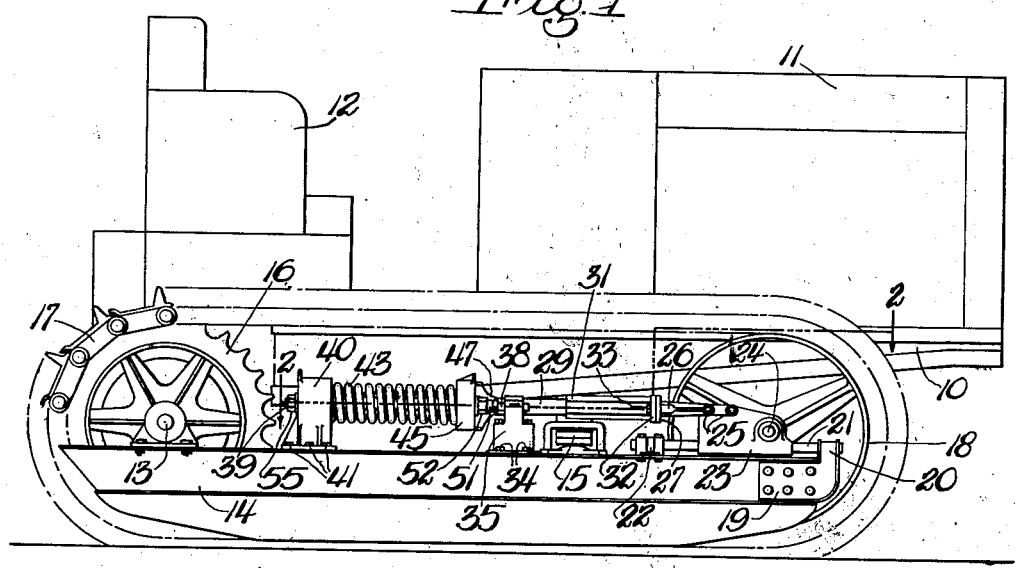
Figure 1 is a general side elevational view of a track type tractor embodying the improved idler mounting and recoil spring assembly thereof.

The tractor generally shown in Figure 1 comprises a longitudinal main frame 10 carrying a power plant indicated generally at 11 at its front end and a driver's seat 12 at its rear end, the rear end of the tractor further including a transverse rear axle generally indicated at 13, which has its opposite ends respectively carried on the rear ends of a pair of oppositely disposed side track frames 14, which run longitudinally alongside the main frame 10 of the tractor and in parallelism therewith in a manner well understood in this art. The drawings show only one track frame 14 on one side of the main frame 10, but it will be understood that another track frame 14 is also disposed on the opposite side, all as is well understood in this art.

Thus, the weight of the main frame 10 is transmitted to the side frames 14 at their rear ends through the axle 13. The weight of the forward portion of the main frame 10 is transmitted in a conventional manner to the forward portions of the side frames 14, respectively, by means of a conventional transverse equalizer bar 15 which between its ends in a well known manner is connected to the body 10 and has its opposite ends respectively resting on or connected to the side frames 14 at the point indicated in Figure 1. Since both track units are the same, only one will be described.

As shown in Figure 1, the end of the axle 13 carries a driving sprocket wheel 16, around which is wrapped the rearward loop of an endless track shoe band or belt 17, the same enveloping the side frame 14 with the side frame carrying at its front end an idler wheel 18, around which the forward loop of the belt 17 is wrapped. The idler wheel 18 is mounted in the following manner.

As shown in Figures 1 and 2, each side frame 14 at its front end has securely fastened thereto on opposite sides, respectively, a pair of plates 19, each of which includes an upstanding sleeve portion 20 presenting a longitudinal bore in which is carried a pair of longitudinally running transversely spaced shafts or rods 21, the rear ends of said rods being respectively carried in a bracket structure 22. Each rod 21 slidably mounts a bracket 23 which carries a transverse bearing for mounting a transverse shaft 24, on which the idler wheel 18 is rotatably mounted. Fastened to the upper, rear end of each journal plate or bracket 23, by means of bolts 25, are the legs of a rearwardly extending, U-shaped yoke 26, the rear end of which is finished with a vertical flange attaching bracket part 27, which rigidly carries, and from which rearwardly extends, a longitudinal shaft portion 28.

Telescopically surrounding this shaft portion 28 is a shaft or rod 29, which extends rearwardly, as shown in Figure 2, and that portion of the rod 29 which surrounds the shaft 28 is provided externally with screw threading 30. Threadedly connected to the threaded part of the rod 29 is an elongated sleeve 31, which is integrally formed with an attaching bracket portion 32 at its front end which is securely but releasably connected by bolts 33 to the bracket portion 27 on the rear end of the yoke 26.

Figure 3:
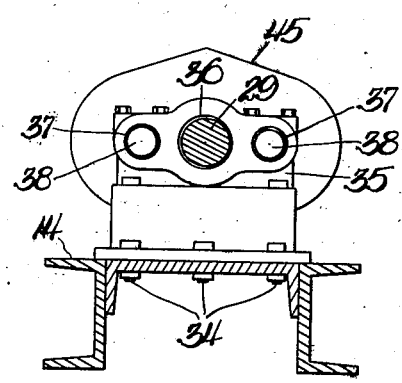
Figure 3 is a general cross sectional view, partly in elevation, taken along the line 3—3 of Figure 2, looking in the direction of the arrows.
Figure 4:
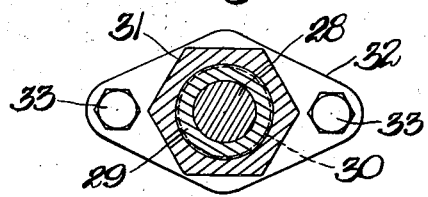
Figure 4 is a similar detail, enlarged, sectional view taken along the line 4—4 of Figure 2, looking in the indicated direction.

The side frame 14, at a point just to the rear of the equalizer bar 15 and, as shown in Figures 2 and 3, has mounted thereon by means of bolts 34 an upstanding guide block 35 provided centrally with a bore 36, through which the rear end of the shaft 29 is loosely passed.

Each side of the block 35 on opposite sides of the shaft 29 is provided with a longitudinal bore 37 in which is loosely and slidably fitted the front end, respectively, of a pair of longitudinally disposed, parallel bolts 38. These bolts 38 extend rearwardly and have their rear ends screw-threaded, as at 39, into a sturdy bracket 40, which is securely mounted by bolts 41 on the top side of the track frame 14 at a point just in advance of the forward periphery of the driving sprocket wheel 16. As shown in Figure 2, this bracket 40 at its front side provides a cavity 42, so that a pair of heavy coil springs 43, which are respectively disposed around the bolts 38, may be backed against the rear wall of the bracket 40. The forward end of each of these springs is nested in an appropriate recess 44 provided by a bracket 45, which is floatingly mounted on the bolts 38 by means of longitudinal bores 46 formed therein. The front side of the bracket 45 includes a sleeve portion 47 extending forwardly to receive the reduced rear end 48 of the rod or shaft 29. The reduced end 48 is formed with a longitudinal slot 49, and a pin 50 is passed through the sleeve 47 and slot 49 to connect the rear end 48 of the shaft or rod 29 slidably in the sleeve 47 of the bracket 45, said pin 50, however, serving to prevent relative rotation of the parts with respect to each other.

The ends of the bolts 38, near their front ends where they pass through the bracket 45, are provided with a length of screw threads 51, each threaded portion 51 carrying a castellated nut 52 including rather long notches 53 adapted to receive cotter pins 54 which pass through the notches 53 and a hole formed through the rods, or bolts, 38 so that, when the cotter pins 54 are in place, the nuts 52 cannot be rotated on the threaded portions 51 of the rods, or bolts 38. It will be noted that the nuts 52 are backed against the front ends of the sleeve portions 47 in the brackets 45. The rear end of each bolt 38 projects through the bracket 40 and carries a lock nut 55. This completes the detailed description of the improved idler mounting structure. The use and manner of operation will next be described.

The springs 43, when assembled on the bolts 38 between the bracket 40 at the rear and the bracket 45 at the front, are fixed in compression. This desired compression can be adjusted by rotation of the nuts 52 by means of appropriate wrenches after the cotter pins 54 have been removed. In other words, by means of the nuts 52, the bracket 45 can be moved rearwardly or forwardly as desired to alter the compression of the springs 43. When the desired compression has been produced, the cotter pins 54 are put back in place to keep the nuts 52 from turning. Forward movement of the bracket 45 with respect to the rear end of the shaft 29 is prevented by means of a shoulder provided by the reduced end 48 which abuts the front edge of the sleeve 47 on the bracket 45.

When a stone or other obstruction gets caught in the track shoe belt or between it and one of the usual track rollers, not described but included in the track mechanism, thus causing tension of the track, a force is set up causing the idler wheel 18 with its journal 23 to slide back on the rods 21. Through the fixed threaded connections between the parts 31 and 29, this push is transmitted through the part 29 with the shoulder at the rear end thereof abutting the sleeve 47 to push the bracket 45 back and temporarily compress the springs, so that they act as a recoil or cushion to take this thrust. Such a rearward movement of the idler wheel, of course, causes temporary slackening in the track shoe belt, and such slack permits the stone or other obstruction to be freed and to be removed from the belt. When the obstruction has left the belt, the springs 43 extend again to their normal set fixed compression, and by this is meant that the brackets 45 can move forwardly again until they are stopped by the nuts 52.

It is interesting to note by the construction described that the idler wheel 18 can be moved fore and aft on the rods 21 to vary the tension in the track without altering in any manner whatsoever the desired initial set, or fixed compression, of the recoil springs 43. This is accomplished by removing the bolts 33 and rotating the sleeve portion 31 on the threaded portion 30 of the rod or shaft 29, and by means of this threaded connection the yoke 26 may be moved forwardly or rearwardly to cause similar movement of the idler wheel 18 and its journal 23 on the rods 21. As this longitudinal movement of the idler wheel mount occurs, it is obvious that the shaft 29 does not rotate, since the pin 50 prevents it from doing so, and, of course, this is a desirable feature to prevent any disturbance whatsoever of the setting of the springs 43. When the idler wheel 18 has been located in the desired position on the forward end of track frame 14, the bracket 32, by means of the bolts 33, is once more rigidly secured to the bracket part 27 of the yoke 26, thereby securing the idler wheel 18 in the desired position of adjustment.

It is the intention to cover herein all changes and modifications of the preferred embodiment of the invention above described which do not in material respects constitute departures from the spirit and scope of the invention.

What is claimed is:

1. In a track-type tractor, a longitudinal side frame carrying at its forward end a movably mounted journal for mounting an idler wheel adapted to carry the forward loop of an endless track belt, said journal including a rearwardly extending yoke, a rod portion included in the yoke and extending rearwardly over the frame, a longitudinal shaft having its front end telescopically fitted slidably over the rod, the outer surface of a portion thereof being screw-threaded, a bracket releasably secured to the yoke including a rearwardly extending sleeve threadedly connected to the threaded portion of the shaft, a guide on the frame slidably mounting the shaft, a second bracket carried for sliding movement on the rear end of the shaft, means to prevent relative rotation between the shaft and second bracket, a third bracket anchored to the frame near the rear end thereof, a longitudinal guide bolt anchored at its rear end in the third bracket and having its front end slidably carried in the guide, said bolt being passed loosely at its front end through the second bracket, a coil spring surrounding the bolt and held in compression between the second and third brackets, a nut threadedly carried on the bolt forwardly of the second bracket to stop the bracket in a forward direction, and said third bracket having a portion abutted by a shoulder formed on and near the rear end of the shaft.

2. In a track type tractor, a longitudinal side frame carrying at its forward end a movably mounted journal for mounting an idler wheel carrying the forward loop of an endless track belt, said journal including a rearwardly extending yoke, a rod portion included in the yoke and extending rearwardly over the frame, a rearwardly extending shaft having its front end hollowed and telescopically fitted slidably over the rod, the outer surface of the hollow portion being screw-threaded, a first bracket releasably secured to the yoke including a rearwardly extending threaded sleeve portion threadedly connected to the threaded portion of the shaft, a guide block on the frame slidably mounting the rear portion of the shaft, a second bracket carried for sliding movement on the rear end of the shaft rearwardly of the block, means to prevent relative rotation between the shaft and second bracket, a third bracket anchored to the frame at its rear end, a longitudinal guide bolt anchored at its rear end in the third bracket and having its front end slidably carried in the guide block, said bolt being passed loosely through the second bracket, a coil spring surrounding the bolt and held in compression between the second and third brackets, a nut threadedly carried on the bolt forwardly of the second bracket, and a shoulder on the shaft abutting the second bracket.

3. In a track type tractor, a longitudinal frame carrying at its forward end a movably mounted journal for mounting an idler wheel carrying the forward loop of an endless track belt, said journal including a rearwardly extending yoke, a rod portion included in the yoke and extending rearwardly over the frame, a rearwardly extending shaft having its front end hollowed and telescopically fitted slidably over the rod, the outer surface of the hollow portion being screw-threaded, a bracket releasably secured to the yoke including a rearwardly extending threaded sleeve portion threadedly connected to the threaded portion of the shaft, a guide block on the frame slidably mounting the rear end of the shaft, and a recoil mechanism on the rear end of the frame comprising a spring held in normal fixed compression, said mechanism including a front bracket held against movement in a forward direction, the rear end of the shaft thrusting against the bracket of the recoil mechanism.

4. In a track type tractor, a longitudinal side frame carrying at its forward end a movably mounted journal for mounting an idler wheel carrying the forward loop of an endless track belt, said journal including a rearwardly extending yoke, a rod portion included in the yoke and extending rearwardly over the frame, a rearwardly extending shaft having its front end hollowed and telescopically fitted slidably over the rod, the outer surface of the hollow portion being screw-threaded, a rearwardly extending threaded sleeve portion threadedly connected to the threaded portion of the shaft and releasably secured to the yoke, a guide block on the frame slidably mounting the rear end of the shaft, a bracket carried for sliding movement on the rear end of the shaft rearwardly of the block, means to prevent relative rotation between the shaft and bracket, a second bracket anchored to the frame near the rear end thereof, a longitudinal guide bolt anchored at its rear end in the second bracket and having its front end slidably carried in the guide block, said bolt being passed loosely through the first bracket, a coil spring surrounding the bolt and held in compression between the two brackets, a nut threadedly carried on the bolt forwardly of the first bracket, and the shaft having a shoulder abutting the first bracket.

5. In a track type tractor, a longitudinal side frame carrying at its forward end a journal for movably mounting an idler wheel carrying the forward loop of an endless track, said journal including a rearwardly extending yoke, a rod portion included in the yoke and extending rearwardly over the frame, a rearwardly extending shaft having its front end telescopically fitted slidably over the rod, the outer surface of a portion of the shaft being screw-threaded, a rearwardly extending threaded sleeve portion threadedly connected to the threaded portion of the shaft and releasably secured to the yoke, a guide on the frame slidably mounting the rear end of the shaft, and a fixed in compression recoil spring assembly mounted on the rear end of the frame including a slidable front bracket held against forward movement, the bracket being slidably mounted on the rear end of the shaft with the latter having a shoulder abutting the bracket.

6. In a track type tractor, a longitudinal frame carrying at its forward end a journal for movably mounting an idler wheel carrying the forward loop of an endless track, said journal including a rearwardly extending yoke, a rod portion included in the yoke and extending rearwardly over the frame, a rearwardly extending shaft having its front end telescopically fitted slidably over the rod, the outer surface of a portion of the shaft being screw-threaded, a rearwardly extending threaded sleeve portion threadedly connected to the threaded portion of the shaft and releasably secured to the yoke, a guide block on the frame slidably mounting the rear end of the shaft, a bracket carried for sliding movement on the rear end of the shaft rearwardly of the block, means to prevent relative rotation between the shaft and bracket but permitting limited relative endwise displacement between the bracket and shaft, and recoil mechanism including a fixed in compression spring abutting the rear face of the bracket with the rear end of the shaft including a shoulder abutting the front face of the bracket.

7. In a track type tractor, a longitudinal frame carrying at its forward end a journal for movably mounting an idler wheel carrying the forward loop of an endless track, said journal including a rearwardly extending yoke, a rod portion included in the yoke and extending rearwardly over the frame, a rearwardly extending shaft having its front end telescopically fitted slidably over the rod, the outer surface of a portion of the shaft being screw-threaded, a rearwardly extending threaded sleeve portion threadedly connected to the threaded portion of the shaft and releasably secured to the yoke, a guide on the frame slidably mounting the rear end of the shaft, a bracket carried for sliding movement on the rear end of the shaft rearwardly of the guide, means to prevent relative rotation between the shaft and bracket, a second bracket anchored to the frame near the rear end thereof, a pair of longitudinal, spaced guide bolts anchored at their rear ends in the second bracket and having their front ends slidably carried in the guide, said bolts being passed loosely through the first bracket at their front ends, a coil spring surrounding each bolt and held in compression between the two brackets, a nut threadedly carried on each bolt forwardly of the first bracket, and the shaft having a shoulder adjacent its rear end abutting the first bracket.

8. In a track type tractor, a longitudinal side frame carrying at its forward end a movably mounted journal for mounting an idler wheel adapted to carry the forward loop of an endless track belt, said journal including a rearwardly extending yoke, a rod portion included in the yoke and extending rearwardly over the frame, a rearwardly extending shaft having its front end hollowed and telescopically fitted slidably over the rod, the outer surface of the hollow portion being screw-threaded, a bracket releasably secured to the yoke including a rearwardly extending threaded sleeve portion threadedly connected to the threaded portion of the shaft, a guide block on the frame slidably mounting the rear end of the shaft, a second bracket carried for sliding movement on the rear end of the shaft rearwardly of the block, means to prevent relative rotation between the shaft and bracket, a third bracket anchored to the frame near the rear end thereof, a pair of longitudinal guide bolts anchored at their rear ends in the third bracket and having their front ends slidably carried in the guide block, said bolts being passed loosely through the second bracket, a coil spring surrounding each bolt and held in compression between the second and third brackets, a nut threadedly carried on each bolt forwardly of the second bracket, and said second bracket being abutted by the shaft.

9. In a track type tractor, a longitudinal side frame carrying at its forward end a pair of longitudinal, transversely spaced rods, journal brackets respectively carried for sliding movement on the rods and including an idler wheel carried therebetween on a horizonal transverse axis, a rearwardly extending yoke connected with the brackets and including a rearwardly extending shaft, a second shaft including a hollow exteriorly threaded end telescopically and slidably fitted over the first shaft, said yoke releasably carrying an internally threaded sleeve secured on to the threaded end of the second shaft, the second shaft having its rear end reduced to provide a shoulder, a rear bracket anchored to the rear end of the frame and a front bracket slidably carried on the reduced end of the second shaft with the shoulder abutting the front bracket, and bolts carried in the rear and front brackets with compression springs located on the bolts between the brackets, said spring assembly including means to fix the springs in compression and serving as a cushion for recoil of the idler wheel.

10. In a track type tractor, a longitudinal side frame carrying at its front end a pair of longitudinal, transversely spaced rods, journal brackets respectively carried for sliding movement on the rods and including an idler wheel carried therebetween on a horizontal transverse axis, a rearwardly extending yoke connected with the brackets and including a rearwardly extending shaft, a second shaft having an exteriorly threaded end telescopically and slidably fitted over the first shaft, said yoke releasably carrying an internally threaded sleeve secured onto the threaded end of the second shaft, a rear bracket anchored to the rear end of the frame and a front bracket slidably carried on the reduced end of the second shaft abutting the front bracket, and bolts carried in the rear and front brackets with compression springs located on the bolts between the brackets, said spring assembly including means to fix the springs in compression and serving as a cushion for recoil of the idler wheel.

11. In a track type tractor, a longitudinal side frame carrying at its forward end a pair of longitudinal, transversely spaced rods, journal brackets respectively carried for sliding movement on the rods and including an idler wheel carried therebetween on a horizontal transverse axis, a rearwardly extending yoke connected with the brackets and including a rearwardly extending shaft, a second shaft including a hollow exteriorly threaded end telescopically and slidably fitted over the first shaft, said yoke releasably carrying an internally threaded sleeve secured onto the threaded end of the second shaft, the second shaft having its rear end reduced to provide a shoulder, a guide on the frame for slidably carrying the rear portion of the second shaft, a rear bracket anchored to the rear end of the frame and a front bracket slidably carried on the rear end of the second shaft, and bolts carried horizontally and longitudinally in the rear and front brackets with compression springs located on the bolts between the brackets, said bolts forwardly of the front bracket being threaded and carrying nuts to fix the springs in compression between the brackets, and the rear end of the second shaft having means to thrust against the front bracket.

12. In a track type tractor, a longitudinal side frame carrying at its forward end a pair of longitudinal, transversely spaced rods, journal brackets respectively carried for sliding movement on the rods and including an idler wheel carried therebetween on a horizontal, transverse axis, a rearwardly extending yoke connected with the brackets and including a rearwardly extending shaft, a second shaft including a hollow exteriorly threaded end telescopically and slidably fitted over the first shaft, said yoke releasably carrying an internally threaded sleeve secured on to the threaded end of the second shaft, the second shaft having its rear end reduced to provide a shoulder, a rear bracket anchored to the rear end of the frame and a front bracket slidably carried on the reduced end of the second shaft with the shoulder abutting the front bracket, and a longitudinal bolt carried in the rear and front brackets with a compression spring encircling the bolt between the brackets, the bolt extending slidably and forwardly through the front bracket, the forward extension of the bolt being threaded and carrying a nut to stop forward movement of the front bracket on the bolt.

13. In a track type tractor, a longitudinal side frame carrying at its forward end a pair of longitudinal, transversely spaced rods, journal brackets respectively carried for sliding movement on the rods and including an idler wheel carried therebetween on a horizontal transverse axis, a rearwardly extending yoke connected with the brackets and including a rearwardly extending shaft, a second shaft including an exteriorly threaded end telescopically and slidably fitted over the first shaft, said yoke releasably carrying an internally threaded sleeve secured onto the threaded end of the second shaft, the second shaft having its rear end reduced to provide a shoulder, a rear bracket anchored to the rear end of the frame and a front bracket slidably carried on the reduced end of the second shaft with the shoulder abutting the front bracket, and a bolt carried rigidly in the rear bracket and slidably in the front bracket with a compression spring encircling the bolt between the brackets, said bolt including means to fix the springs in compression between the brackets.

14. In a track type tractor, a longitudinal side frame carrying at its forward end a pair of longitudinal, transversely spaced rods, journal brackets respectively carried for sliding movement on the rods and including an idler wheel carried therebetween on a horizontal transverse axis, a rearwardly extending yoke connected with the brackets and including a rearwardly extending shaft, a second shaft including a hollow exteriorly threaded end telescopically and slidably fitted over the first shaft, said yoke releasably carrying an internally threaded sleeve secured onto the threaded end of the second shaft, the second shaft having its rear end reduced to provide a shoulder, a rear bracket anchored to the rear end of the frame and a front bracket slidably carried on the reduced end of the second shaft with the shoulder abutting the front bracket, means to prevent turning of the second shaft in the front bracket, a longitudinal bolt carried in the rear and front brackets with a compression spring located on the bolt between the brackets, said bolt passing slidably through the front bracket and including a threaded portion carrying a nut in advance of the front bracket.

DAVID B. BAKER.
CLIFFORD R. ROGERS.
NORMAN O. PANZEGRAU.